Dec. 26, 1933.   H. D. STEVENS   1,941,114
TUBE BUILDING METHOD AND APPARATUS
Filed Jan. 20, 1931   3 Sheets-Sheet 1
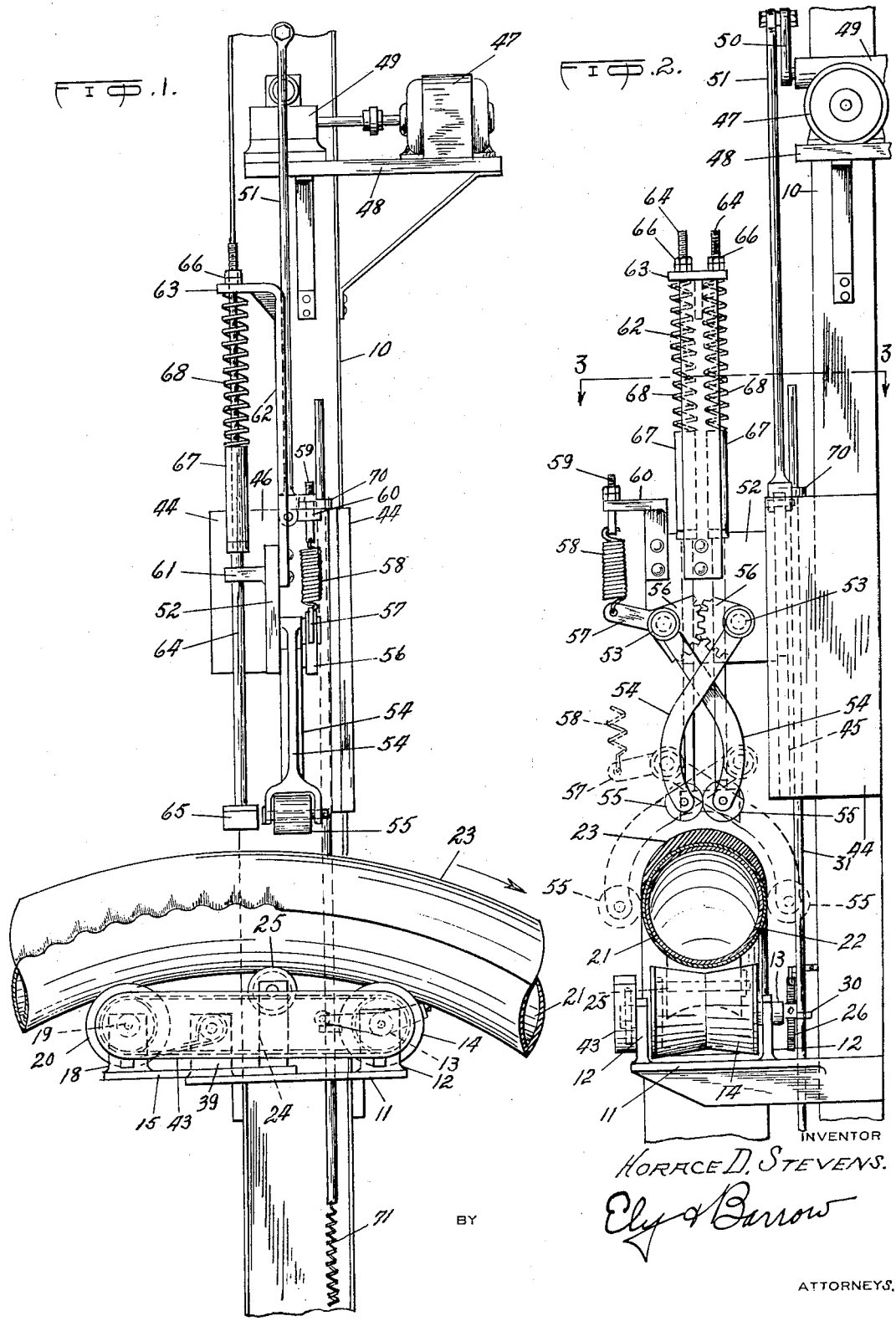
INVENTOR
HORACE D. STEVENS.
BY
ATTORNEYS.

Dec. 26, 1933.     H. D. STEVENS     1,941,114
TUBE BUILDING METHOD AND APPARATUS
Filed Jan. 20, 1931     3 Sheets-Sheet 2

INVENTOR
Horace D. Stevens.
BY
ATTORNEYS.

Dec. 26, 1933.  H. D. STEVENS  1,941,114
TUBE BUILDING METHOD AND APPARATUS
Filed Jan. 20, 1931  3 Sheets-Sheet 3
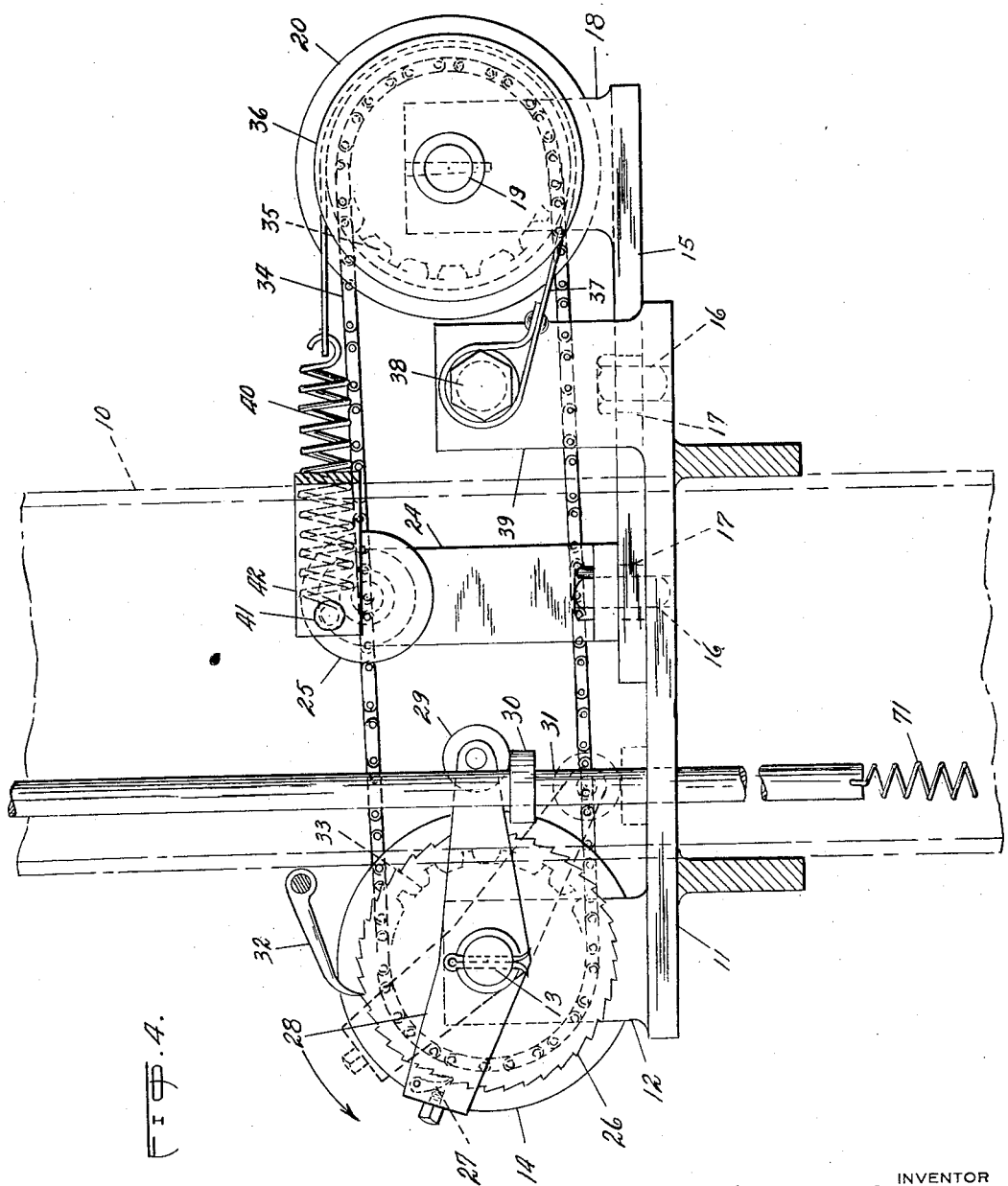
INVENTOR
HORACE D. STEVENS.
BY
ATTORNEYS Patented Dec. 26, 1933

1,941,114

UNITED STATES PATENT OFFICE

1,941,114

TUBE BUILDING METHOD AND APPARATUS

Horace D. Stevens, Akron, Ohio, assignor to The Firestone Tire & Rubber Company, Akron, Ohio, a corporation of Ohio Application January 20, 1931. Serial No. 509,927

16 Claims. (Cl. 154—14)

This invention relates to tube-building methods and apparatus, and more especially it relates to procedure and mechanism for applying, in an improved manner, a longitudinally extending strip of reinforcing material comprising rubber to a tube of unvulcanized rubber in the manufacture of reinforced rubber tubes, such as puncture-proof inner tubes for pneumatic tire casings.

The chief objects of the invention are to avoid strain and distortion of the tube structure during the application of the reinforcing strip; substantially to obviate creeping of the tube on its support by reason of the pressure applied to attach the reinforcing strip; to prevent such creeping of the tube as may occur from being cumulative in the entire tube; and to provide an improved method and improved apparatus for attaining the foregoing objects. A more specific object is to provide automatic mechanical means for stitching or adhesively pressing a reinforcing strip to a tube of unvulcanized rubber composition.

Of the accompanying drawings:

Figure 1 is a front elevation of apparatus embodying and adapted to carry out the invention in its preferred form, and the work therein, part of the latter being broken away;

Figure 2 is a side elevation of the apparatus shown in Figure 1, the work being shown in section;

Figure 4 is a rear elevation, on a larger scale, of the work supporting and driving mechanism.

Figure 3:
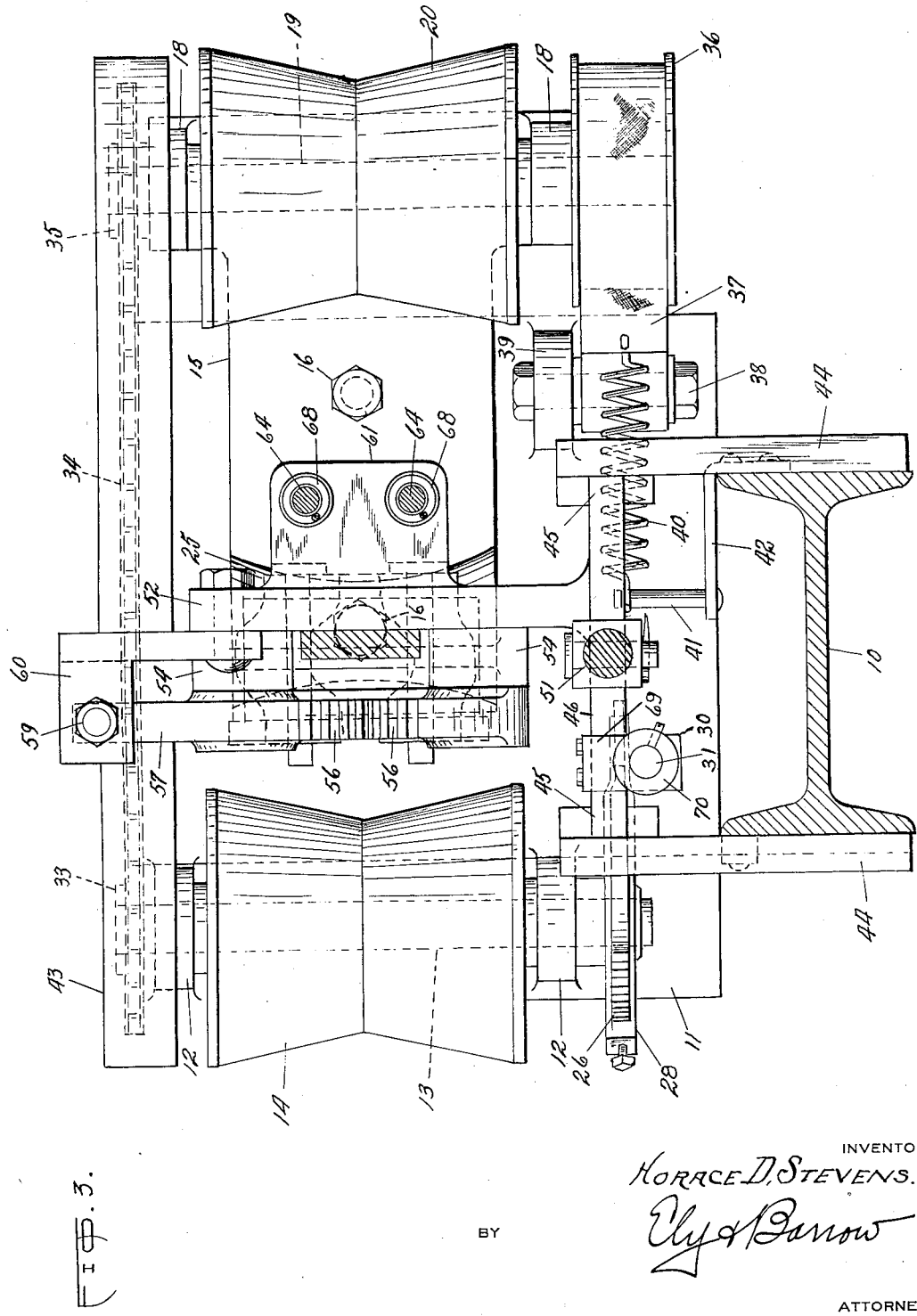
Figure 3 is a section, on a larger scale, taken on the line 3—3 of Figure 2.

Referring to the drawings, 10 is a vertical post or I-beam which is suitably supported at its respective ends (not shown), and at an intermediate height supports a shelf 11 which carries the work supporting and driving mechanism. At one side the shelf 11 is formed adjacent its front and rear with respective upstanding ears 12, 12 which comprise journals for a horizontal shaft 13, and the latter carries a centrally grooved or waisted roller 14 which is secured thereon between the ears 12.

The other side of the shelf 11 carries an extension 15 which is adjustably secured to the shelf by bolts 16, 16 which pass through respective slots 17 in the extension. The overhanging end of the extension 15 is formed at front and rear with respective upstanding ears 18, 18 which comprise journals for a shaft 19, and the latter carries a centrally grooved or waisted roller 20 which is identical with the roller 14 and disposed parallel thereto.

The rollers 14, 20 are adapted to support and feed the work which is shown herein as a tube of unvulcanized rubber composition 21 mounted upon an arcuate mandrel 22, and having a longitudinally extending reinforcing strip 23 of unvulcanized rubber, and other constituent material if desired, lightly attached to its outer periphery, the respective lateral marginal portions of the strip 23 being unattached. Although the work is not shown in its entirety, it will be understood that the mandrel 22 is of the usual arcuate type having spaced-apart ends to permit mounting and removal of the work. If desired, a bracket 24 may be mounted upon the shelf-extension 15 between the rollers 14, 20 as a support for a third waisted roller 25 which engages the work between the two aforesaid rollers and prevents pendulous movement of the work upon the rollers 14, 20 as an axis.

The rollers 14, 20 are adapted to feed the work intermittently in the direction indicated by the arrow in Figure 1, and for driving said rollers the shaft 13 is extended beyond its journals and provided at one end with a ratchet 26 which is engaged by a feed-pawl 27 mounted in one end of a lever 28 that is journaled on said shaft 13, the other end of the lever 28 carrying a roller 29 that is engaged by a collar 30 mounted upon a vertically reciprocable rod 31. Up and down movement of the collar 30 rocks the lever 28 through an arc defined by the full line and broken line positions of the lever as shown in Figure 4 to effect intermittent rotary movement of the roller 14, and retrogressive movement of the ratchet 26 is prevented by a stop-pawl 32 which is mounted upon the post 10 and engages the ratchet. The rod 31 extends through the shelf 11, and the collar 30, which is above the shelf, limits the downward movement of the rod 31.

The other end of the shaft 13 is provided with a sprocket 33 that is connected by a sprocket chain 34 with a sprocket 35 mounted upon the adjacent end of the shaft 19, for driving the roller 20 in the same direction at the same speed as the roller 14. Mounted upon the opposite end of the shaft 19 is a brake-drum 36 which is engaged by a brake-band 37 for preventing over-run of the rollers 14, 20 at the end of their work-feeding movements. One end of the brake-band is fixedly secured to a stud 38 which extends laterally from an upstanding ear 39 formed on the shelf 11, and the other end of the brake-band is connected to one end of a tension spring 40, the other end of which is attached to a stud 41 projecting from a bracket 42 that is mounted upon the post 10. A guard 43 is mounted over the sprockets 33, 35 and the sprocket chain 34.

Mounted upon opposite sides of the post 10, at an elevation somewhat above the work, are respective guide-plates 44, 44, which extend beyond the front of the post and are formed thereat with vertical slideways 45, 45 for a reciprocable slide 46. The slide 46 is reciprocated by a motor 47 that is mounted in an elevated position upon a shelf 48 supported from the post 10, the motor driving through a reduction-gear device 49 to a crank 50 that is connected by a link 51 to the upper end of the slide 46.

Projecting forwardly from the slide 46 is a web or rib 52, and journaled on one lateral face thereof at 53, 53 is a pair of arms 54, 54 which extend downwardly and cross each other, the free ends of said arms being provided with respective presser rollers 55, 55 which are normally disposed in abutting relation above the work, and on opposite sides of the medial plane thereof, as is shown in Figure 2. Also journaled at 53, 53 are respective quadrants or gear sectors 56, 56 which are meshed with each other and pinned or otherwise secured to the respective arms 54. One of the gear sectors is provided with a radial lever arm 57 which has its free end connected to one end of a tension spring 58, the other end of the latter being connected to an adjustable stud 59 carried by a bracket 60 which is mounted upon the web 52. The arrangement is such that the spring 58 normally holds the arms 54 in the position in which their end-rollers 55 abut each other, and yieldingly resists spreading apart of the free ends of the arms.

Projecting from the opposite side of the web 52 is a bracket 61, and secured to the web and extending upwardly therefrom is an arm 62 which has its upper end bent at right angles to provide a bracket 63, which bracket is in vertical alignment with the bracket 61. Each bracket 61, 63 is formed with two apertures, the apertures in one bracket being axially aligned with those of the other bracket, and slidably mounted in said apertures is a pair of parallel, vertical rods 64, 64 upon the lower end of which is a presser-foot 65.

The upper end of each rod 64 is threaded to receive a pair of nuts 66 which are positioned above the bracket 63. Between the brackets 61, 63 each rod 64 carries an adjustable collar 67, and a compression spring 68 is mounted upon each rod between the collar 67 thereon and the bracket 63. The arrangement is such the presser-foot 65, which has an arcuate, work-engaging bottom face, is periodically applied yieldingly to the outer peripheral portion of the work as the slide 46 is reciprocated.

The reciprocable rod 31 that actuates the work-feeding mechanism has its upper end slidably mounted in an apertured bracket 69 (see Figure 3) which is mounted upon the upper edge of the slide 46, and a collar 70 is mounted upon the rod above said bracket 69. The lower end of the rod 31 is connected to one end of a tension spring 71, the other end of which is connected to any suitable stationary member (not shown). The arrangement is such that the work is intermittently indexed or fed forward a determinate distance in timed relation to the reciprocating movement of the slide 46.

In the operation of the apparatus, the slide 46 being in the elevated, inoperative position shown in full lines in Figures 1 and 2, a mandrel 22 with an unvulcanized tube 21 and reinforcing strip 23 thereon is mounted upon the grooved rollers 14, 20 and 25, one end portion of the mandrel resting upon the roller 14 so that the pressing down of the reinforcing strip 23 will be initiated at one end thereof. The motor 47 is then set in motion and the apparatus automatically applies rolling pressure to the reinforcing strip in the direction toward its lateral margins in successive abutting or overlapping zones longitudinally of the work as the latter is intermittently indexed in timed relation to the application of the presser rollers.

As the slide 46 moves downwardly, the presser-foot 65 comes to rest upon the crown or medial zone of the strip 23, and is yieldingly pressed thereagainst by the springs 68 as the latter are compressed by continued downward movement of the slide. The presser rollers 55 upon being urged against the crown of the strip 23, are forced apart, their supporting arms 54 turning on their pivots 53 against the tension of the spring 58, which thereby constantly urges the presser-rollers against the surface of the strip 23 as they move toward the lateral margins thereof. At the lowermost position of the slide 46 the rollers 55 are in the broken line positions shown in Figure 2, the collar 30 of the rod 31 is resting upon the shelf 11, as is shown in broken lines in Figure 4, and the bracket 69 of the slide is positioned well below the collar 70 on the rod 31.

Upward movement of the slide 46 restores the presser-foot 65 and the presser-rollers 55 to their normal inoperative positions above the work, and near the peak of the upward movement of the slide the bracket 69 engages the collar 70 on the rod 31 and raises the latter, against the tension of the spring 71, with the result that the work-supporting rollers 14, 20 are rotated through a determinate angle through the agency of the pawl 27 and ratchet 26. Thus the work is fed circumferentially and an unpressed region thereof is presented to the presser-foot and presser rollers during the next cycle of operation of the apparatus.

The apparatus is substantially automatic in its operation, requiring only manual mounting and removal of the work. The apparatus produces work of superior quality and accomplishes the other advantages set out in the foregoing statement of objects.

Modification may be resorted to within the scope of the appended claims which are not limited wholly to the specific construction shown or exact procedure described.

What is claimed is:

1. The method of building tubes which comprises fabricating the body structure thereof, and then compacting the same by applying pressure thereto in the direction transverse to the longitudinal axis of the tube while the latter is stationary.

2. The method of building tubes which comprises fabricating the body structure thereof, and then compacting succeeding regions of the same in the longitudinal direction by pressure applied in the direction transverse to the longitudinal axis of the tube while the latter is stationary.

3. The method of building tubes which comprises fabricating the body structure of the tube, and then compacting the same by applying rolling pressure thereto while the tube is stationary, starting on one side of the tube and progressing in opposite directions therefrom transversely of the longitudinal axis of the tube.

4. A method as defined in claim 3 in which the pressure is applied in succession to adjacent or overlapping regions longitudinally of the tube.

5. The method of making rubber tubes which comprises mounting a strip of reinforcing material on the tube longitudinally thereof, applying pressure to the middle of the strip, and concurrently applying rolling pressure to the strip toward its respective lateral margins.

6. The method of making rubber tubes which comprises feeding the tube longitudinally step-by-step, and applying compacting pressure to entire transversely disposed regions of the tube as it is so fed.

7. A method of making rubber tubes as defined in claim 6 in which the compacting pressure is applied to the tube during the intervals that it is stationary between successive forward steps.

8. The method of making tubes which comprises applying a strip of reinforcing material longitudinally of a tube, intermittently feeding the assembled structure longitudinally, and applying rolling pressure to the reinforcing strip transversely of the feed of the tube at determinate time intervals.

9. Tube building apparatus comprising means for feeding a tube longitudinally, and means comprising a roller having its axis substantially parallel to the feed of the tube for applying rolling pressure to the tube transversely of the direction of its feed.

10. Tube building apparatus comprising means for feeding a tube longitudinally step-by-step, and means for applying compacting pressure locally to the tube between feeding movements thereof.

11. Tube building apparatus comprising means for feeding a tube intermittently in a longitudinal direction, and means operating in timed relation to the feed of the tube for applying compacting pressure thereto during the intervals that it is stationary.

12. Tube building apparatus comprising means for supporting and longitudinally feeding an arcuate tube structure by engagement with the inner periphery thereof, and reciprocating tube-pressing means comprising a roller having its axis substantially parallel to the feed of the tube operating against the outer peripheral portion of the tube structure.

13. Tube building apparatus as defined in claim 12 in which the tube structure is intermittently fed, and the pressing means is so constructed as to reciprocate in timed relation to the feed of the tube.

14. Tube building apparatus comprising means for supporting a tube structure, a reciprocable slide movable toward and away from the tube, and tube-pressing means on said slide adapted concurrently to engage and press the tube structure on opposite sides of a plane passing through the axis of the tube.

15. Tube building apparatus comprising means for supporting a tube structure, a reciprocable slide movable toward and away from the tube, a pair of arms pivoted on said slide, presser-rollers on the ends of said arms adapted to engage the tube, the pivots of said arms being so arranged that the free ends of the arms spread apart when the presser-rollers are forced against the tube, and yielding means resisting said spreading apart movement of the arms.

16. Tube building apparatus comprising means for supporting an arcuate tube structure from the inner periphery thereof, a reciprocable slide movable substantially radially of the tube structure, and tube-pressing mechanism carried by said slide adapted to engage the tube structure on the outer periphery thereof and to move in opposite directions transversely of the tube exerting yielding pressure thereagainst.

HORACE D. STEVENS.